Nov. 1, 1932.   C. J. WESTLING   1,885,970
ANTIFRICTION SCREW
Filed Jan. 10, 1929
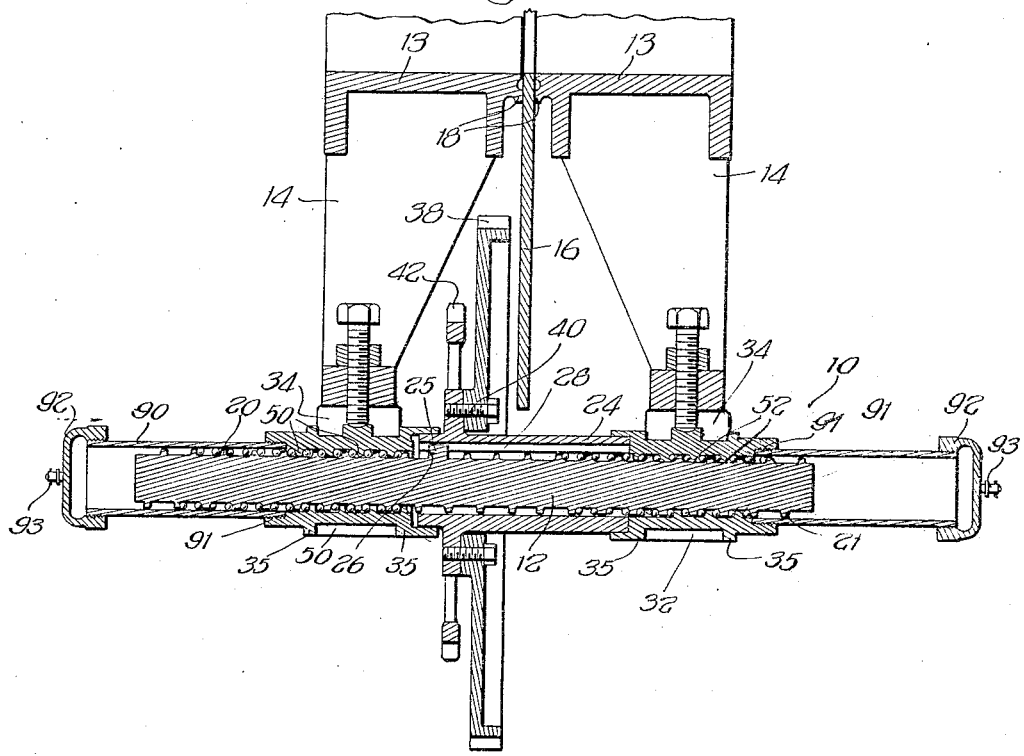
Witness
William P. Kilroy
Inventor
Carl J. Westling
By Brown, Jackson, Boettcher & Dienner
Attys Patented Nov. 1, 1932

1,885,970

UNITED STATES PATENT OFFICE

CARL J. WESTLING, OF CHICAGO, ILLINOIS

ANTIFRICTION SCREW

Application filed January 10, 1929. Serial No. 331,642.

This invention relates to an anti-friction screw.

While I shall describe the invention in connection with one of the jack units of my co-pending application, Serial No. 331,641 filed January 10, 1929, it is to be understood that the present invention is not limited to such use but may be employed wherever suitable or desired and the details may be varied to suit different applications.

The object of the present invention is to reduce the friction in the screw. This is particularly advantageous where the screw is a differential screw for moving or imposing a relatively great force upon parts which are relatively large and heavy. The reduction in friction increases the ease of operation and permits the imposition of a great force or operation of a relatively large heavy part with a very slight applied effort either manual or power. By the embodiment of the present invention in a differential screw the friction may be reduced, the ease of travel increased and at the same time by proportioning the differential with respect to the increased efficiency the screw may still be made self-locking.

In a screw not provided with anti-friction means in the manner of the present invention it has heretofore been necessary to make the nut of bronze or other metal with a low coefficient of friction. By means of the provisions of the present invention the necessity of making the nut of a metal having a low coefficient of friction is avoided and the nut as well as the screw may be hardened and ground. The relatively wide spacing of the threads which the present invention provides for the anti-friction means between the threads permits easier or facilitates hardening and grinding of the threads.

According to the preferred form of my invention, the anti-friction means comprises ball bearing members arranged helically between the threads of the screws and the co-operating threads of the nut or other member having threaded cooperation with the screw. The ball bearing members are held in helically spaced relation and prevented from piling up at the end of the screw or at any other portion therealong by a helical retainer. The screw threads are formed to permit arrangement of the bearing and retaining elements helically therebetween and the bearing members may be arranged in helically spaced openings or otherwise suitably held in the retainer. By the provisions of the present invention, the ball bearing members may be relatively small, even where the load is relatively great, because of the large number of bearing members and the distribution of the load over all of the bearing members. With a collar thrust bearing, with a single circular row of ball bearing members for taking the same load or end thrust, the ball members would have to be very much larger than where the bearing members are arranged according to the present invention. With the present invention, the bearing members take the radial, as well as the end thrust, and greatly reduce the friction in all directions.

It is conceivable that bearing members of other than ball formation, such as of roller formation, may be employed, at least with a measure of the advantages of the preferred form of the present invention.

The particular form of the retainer shown may also be varied and such variations are contemplated within the scope of the appended claims.

An embodiment of the invention is illustrated in the accompanying drawing, in which:

Figure 1 is a longitudinal section through a screw or jack unit, embodying the present invention; and Figure 2 is a fragmentary detail section, partially in elevation, showing the anti-friction means between the screw and nut on an enlarged scale.

The invention is shown in Figure 1 of the drawing, in connection with the screw or jack unit of my copending application, above referred to. This differential screw or jack unit is designated in its entirety at 10 and comprises a differential screw 12. In the above application, there are a plurality of these differential screw units, three in the illustrated embodiment of that application spaced equally distant apart about the collar portions 13 of the valve frames 14 in order to apply the pressure uniformly about the pipe ends. The valve plate 16 is disposed for swinging movement between the adjacent ends of the collars 13, which collars 13 are secured to the separated ends of the shaft main or pipe and constitute, in effect, the pipe ends. The adjacent ends of the collars 13 are, preferably, thinned to form relatively thin circular or annular lips 18 which are, preferably, flared outwardly slightly, as shown, and bear firmly when the pressure is on and with great force against the opposite faces of the valve plate 16.

The screw or jack units 10 are adapted for pressing the circular lips 18 firmly and with great force against the opposite faces of the valve plate member 16 and are adapted for releasing or relaxing this pressure to permit swinging of the valve plate 16 between the collars or pipe ends.

Each screw 12 has an external screw thread 20 on one end or one side of its intermediate portion and an external screw thread 21 on its opposite end or on the opposite side of the intermediate portion. Each of the screws 20 and 21 is shown in the form of a single thread screw. The screw threads 20 and 21 are both right-hand or both left-hand screws and the threads 20 are of different pitch from the threads 21, which makes the screw 12 a differential screw, so that the rectilinear movement imparted to the valve frames 14 at opposite sides of the plate 16 by these screws 12 will be in the same direction, but at different speeds. In other words, when these screws are turned, a differential uni-directional rectilinear movement will be imparted to the frames 14 thereby.

For the purpose of rotating or turning the screw 12, a sleeve 24 is splined at 25 on the intermediate portion of the screw 12, as by means of an integral radial spline 26 on the screw 12, engaging in the longitudinal keyway or groove 28 in the sleeve 24. For the purpose of transforming the rotation or turning movement of the screw 12 into rectilinear movement of the frames 14, each of the opposite screw threaded ends 20 and 21 of the screw is provided with an internally threaded nut or collar 30 and 32, respectively.

The nut members 30 and 32 are adjustably mounted in open forks 34 at the outer ends or apices of the frames 14 and the forks 34 fit between flanges 35 on the nut members, so that the frame members will be moved rectilinearly in unison with the movements or longitudinal travel of the nut members along the screw 12. For the purpose of applying the actuating effort, manual or power, to the differential screw or jack unit 10, the sleeve 24 is shown as being provided with a relatively large driving gear 38. This driving gear 38 is shown as being secured at 40 to one side of a chain wheel or sprocket 42 formed integral or suitably secured to the sleeve 24. The driving gear 38 may mesh with a relatively small driving pinion (not shown) and a suitable chain or other flexible connecting element may be trained about the chain or sprocket wheel 42 and about similar wheels on the other screw or jack units for connecting said units for operation together, all as more fully set out in my copending application, already referred to.

The nuts 30 and 32 each have internal threads 50 and 52, respectively, the threads 50 corresponding in pitch and having threaded engagement through the anti-friction means, with the external threads 20 of the screw 12 and the threads 52 having threaded engagement through the anti-friction means therefor, with the external threads 21 of the screw 12.

The anti-friction means for the external threads 20 of the screw 12 and the internal threads 50 of the cooperating nut 30 are, in the illustrated embodiment of the invention, substantially identical with the cooperating threads 21 and 52 at the opposite end of the screw, so that a description of one end will suffice for both.

Referring to Figure 4, the thread 21, for example, of the screw 12, is a single thread of relatively coarse pitch and of square thread formation. The cooperating internal thread 52 of the nut 32 is, likewise, a single thread of a relatively coarse pitch, corresponding with the pitch of the threads 21 and of similar square thread formation. The particular formation and pitch may, of course, vary. The turns of the thread 21 have relatively wide spaces 60 between them and the turns of the thread 52 have similarly relatively wide spaces 62 between them. The spaces 60 overlap the spaces 62 and the threads 52 are disposed substantially centrally between the opposite sides of the grooves 60, in a longitudinal direction, as viewed in Figure 2, leaving a helical space 63, between each of the opposite sides of the threads 54 and the adjacent sides of the adjacent turns or convolutions of the threads 21.

The anti-friction means is arranged in these helical spaces 63 and, in the illustrated embodiment of the invention, comprises two helically arranged rows of ball bearing members 65, one row between each of the opposite sides of the threads 52 and the adjacent sides of the cooperating turns of the thread 21.

The ball bearings 65 are held in helically spaced relation and prevented from piling up at the end of the screw, or at any portion therealong, by a helical retainer 68. The retainer 68 comprises a helical strip of sheet metal, with its opposite sides 70 deflected or turned obliquely and provided with unformly spaced openings 72. The ball members 65 may be retained or held in the openings 72, by lips 74, which may be formed integral with the retainer 68, with a pair of lips at each opening and struck in opposite directions therefrom, that is, one of the lips at each opening being struck inwardly and the other outwardly and, when the bearing member is in place in the opening, these lips being turned or rounded in about the same slightly to hold the bearing members against displacement from the retainer. This bearing arrangement will permit securing the ball members in the retainer and then winding the retainer with the ball members helically in the desired grooves, and when the retainer is removed, the ball members will be removed therewith and held against displacement therefrom. The inner surfaces 76 of the threads 74 are, preferably, spaced from the surfaces 78 of the grooves 60 to freely accommodate the retainer 68 therebetween and the outer surface 80 of the thread 21 is shown as spaced slightly from the surface 82 of the groove 62. The deflected or oblique sides 70 of the retainer preferably clear the screw 12 and thread thereon, as well as the nut 32 and internal thread 52 and are shown as being freely accommodated in the grooves 63.

In the showing of Figure 1, the frame members 14 are illustrated in closed position against the valve member 16 and at the right hand end of their differential travel along the screw 12, the screw 20 at the left hand end in this particular case being proportioned with respect to the screw threads 21 at the right hand end to impart a slightly faster movement to the left hand frame 14 than to the right hand frame 14, so that on movement of both frames to the right, these frames will be closed with great pressure upon the opposite sides of the valve member 16 by the differential movement between the frames. The particular direction or manner of obtaining this differential movement may vary. In that the frames are moved to the left in this particular showing, the ball bearing members 65 are shown as projecting out from the left hand end of the nut 30 and the ball bearing members 65 at the opposite end of the screw are shown as extending to the right hand end of the threaded engagement between the screw thread 21 and the cooperating screw thread 52. The balls 65 will travel one-half of the travel of the screw travel because of the taking up of the other half by the roll of the balls 65 themselves and this arrangement will permit adequate roller bearing action in all positions of the parts.

As already pointed out, the anti-friction means thus provided greatly reduces friction, which increases the ease of operation and permits the imposition of a great force or operation of relatively large, heavy parts with a very slight applied effort, either manual or power.

In a differential screw, as described in connection with the illustrated embodiment, the nut travel is independent of the actual lead of the screw thread. By the embodiment of the invention in a differential screw, in this manner, the friction may be reduced, the ease of travel increased and, at the same time, by proportioning the differential with respect to the increased efficiency, the screw may still be made self-locking in all positions. The relatively wide spaces 60 and 62 between the threads 21 and 52 permits easier hardening and grinding of the threads. Also, as already pointed out, in a screw not provided with anti-friction means in this manner, it has heretofore been necessary to make the nut of bronze or other metal, with a low coefficient of friction and by the present invention, the necessity of making the nuts or any other parts of metal with a low coefficient of friction is avoided and the nut members or other members having threaded cooperation with the screw, as well as the screw itself may be hardened and ground. Due to the relatively great number of ball members, these ball members may be relatively small, even where the load is great, because the great load is distributed over a large number of ball members. The present anti-friction bearing will take care of the same load with very much smaller ball members than would be required of a collar thrust bearing, with a single circular row of balls, were employed with the same load.

The particular screw enclosure shown in Figure 1 is completed by tubes or sleeves 90, screw threaded into the ends of the nut members 30 and 32, respectively, at 91 and provided with caps 92. The caps 92 are provided with suitable "Alemite" or other suitable lubricating fittings 93. The helical retaining members, with the ball bearings carried thereby, are described as being free to travel with respect to the nut members 30 and 32 and are shown as extending from the ends of said nut members. It is to be understood that the nut members may be made sufficiently long that the helical retainers and ball bearings will be confined therein in all positions.

I do not intend to be limited to the precise details shown or described.

I claim:

1. In combination, a pair of members, one having an external thread and the other having a cooperating internal thread, said threads having relatively wide spaces therebetween forming helical spaces between each of the opposite sides of each thread and the sides of the adjacent turns of the other thread, ball bearing members disposed in said helical spaces for action between the threads of said members, and a pressed metal helical retainer for said bearing members, said retainer being disposed between the thread of one member and the bottom of the space between the thread turns of the other member and having its sides deflected diagonally into said helical spaces and carrying said ball members, said ball members contacting the bottoms of the threads of the respective members to take radial thrusts between said members and contacting the sides of the threads of said members to take end thrusts between said members and said helical retainer being disposed wholly outside the spaces between the top of the external thread of the externally threaded member and the bottom of the internal thread of the internally threaded member.

2. In combination, a pair of members, one having an external thread and the other having a cooperating internal thread, said threads having relatively wide spaces therebetween forming helical spaces between each of the opposite sides of each thread and the sides of the adjacent turns of the other thread, ball bearing members disposed in said helical spaces for action between the threads of said members, and a helical retainer for said bearing members and formed of flat material, said retainer being disposed between the thread of one member and the bottom of the space between the thread turns of the other member with its sides deflected angularly into said helical spaces and carrying said ball members, said angular side portions having openings to receive the ball members and lips adjacent the openings for retaining the ball members in position, said ball members contacting the bottoms of the threads of the respective members to take radial thrusts between said members and contacting the sides of the threads of said members to take end thrusts between said members, and said helical retainer being disposed wholly outside the spaces between the top of the external thread of the externally threaded member and the bottom of the internal thread of the internally threaded member.

3. In combination, a pair of members, one having an external thread and the other having a cooperating internal thread, said threads having relatively wide spaces therebetween forming helical spaces between each of the opposite sides of each thread and the sides of the adjacent turns of the other thread, ball bearing members disposed in said helical spaces for action between the threads of said members, and a helical retainer for said bearing members, said retainer being disposed between and out of contact with the thread of one member and the bottom of the space between the thread turns of the other member with its sides deflected angularly into said spaces and provided with openings to receive the balls and means to retain said balls in the openings, said ball members contacting the bottoms of the threads of the respective members to take radial thrusts between said members and contacting the sides of the threads of said members to take end thrusts between said members, and said helical retainer being disposed wholly outside the spaces between the top of the external thread of the external threaded member and the bottom of the internal thread of the internally threaded member.

4. In combination, a pair of members, one having an external thread and the other having a cooperating internal thread, said threads having relatively wide spaces therebetween forming helical spaces between each of the opposite sides of each thread and the sides of the adjacent turns of the other thread, ball bearing members disposed in said helical spaces and contacting with adjacent side faces of the threads of said members to take end thrusts between said members, said ball members also contacting with the bottoms and tops of the spaces between the thread turns of the respective members to take radial thrusts between said members, a helical retainer for said bearing members, said retainer being disposed between the thread of one member and the bottom of the space between the thread turns of the other member with its sides deflected diagonally into said spaces and provided with openings to receive the balls and means to retain said balls in the openings, said helical retainer being disposed wholly outside the spaces between the top of the external thread of the externally threaded member and the bottom of the internal thread of the internally threaded member.

5. In combination, a pair of members, one having an external thread and the other having a cooperating internal thread, said threads having relatively wide spaces therebetween forming helical spaces between each of the opposite sides of each thread and the sides of the adjacent turns of the other thread, ball bearing members disposed in said helical spaces and contacting with adjacent side faces of the threads of said members to take end thrusts between said members, said ball members also contacting with the bottoms and tops of the spaces between the thread turns of the respective members, to take radial thrusts between said members, a helical retainer for said bearing members, said retainer being disposed between and out of contact with the thread of one member and the bottom of the space between the thread turns of the other member with its sides deflected diagonally into said spaces and provided with openings to receive the balls and means to retain said balls in the openings, said helical retainer being disposed wholly outside the spaces between the top of the external thread of the externally threaded member and the bottom of the internal thread of the internally threaded member.

In witness whereof, I hereunto subscribe my name this 7 day of January, 1929.

CARL J. WESTLING.